United States Patent [19]

Schilling

[11] Patent Number: 4,488,582

[45] Date of Patent: Dec. 18, 1984

[54] FLUID MIXER ARRANGEMENT

[75] Inventor: William F. Schilling, Monte Sereno, Calif.

[73] Assignee: Raytheon Company, Lexington, Mass.

[21] Appl. No.: 589,849

[22] Filed: Mar. 16, 1984

Related U.S. Application Data

[63] Continuation of Ser. No. 363,209, Mar. 29, 1982, abandoned, which is a continuation of Ser. No. 154,373, May 20, 1980, abandoned.

[51] Int. Cl.$^3$ .............................................. F16K 31/32
[52] U.S. Cl. ..................... 141/95; 137/423; 141/100; 141/330
[58] Field of Search ................. 141/9, 18, 46, 95, 100, 141/105, 106, 107, 198, 329, 330, 363, 364, 367; 137/417, 423; 222/65; 366/153; 4/381, 384

[56] References Cited

U.S. PATENT DOCUMENTS

| | | | |
|---|---|---|---|
| 1,803,423 | 5/1931 | Brown | 137/417 |
| 3,049,144 | 8/1962 | Oleskow | 137/417 X |
| 3,515,830 | 6/1970 | Johnson | 200/230 |
| 4,080,986 | 3/1978 | Schoepe | 137/432 |
| 4,098,431 | 7/1978 | Palmer et al. | 222/65 X |
| 4,103,358 | 7/1978 | Gacki et al. | 366/153 |
| 4,186,765 | 2/1980 | Anderson | 137/423 X |

Primary Examiner—Stephen Marcus
Assistant Examiner—Mark Thronson
Attorney, Agent, or Firm—Richard M. Sharkansky; Joseph D. Pannone

[57] ABSTRACT

A fluid mixer arrangement such as for mixing fluid concentrates with water to produce a mixture available on a demand basis. One embodiment includes two such mixing arrangements particularly suited to semiautomatically provide separate fixer and developer fluid mixtures for film development. In each mixer arrangement, bottles of liquid chemicals are positioned in inverted fashion above a tank with hydraulically operated piercing knives located to pierce the caps of the bottles to replenish the chemical mixture in the tank. When the mixture of fluid in the tank reaches a certain minimum level, a secondary float permits a valve to open, coupling pressurized tap water to cylinders to activate the piercing knives and also to permit water flow into the tank. A primary float closes the valve when the fluid mixture in the tank reaches its desired high level.

4 Claims, 7 Drawing Figures

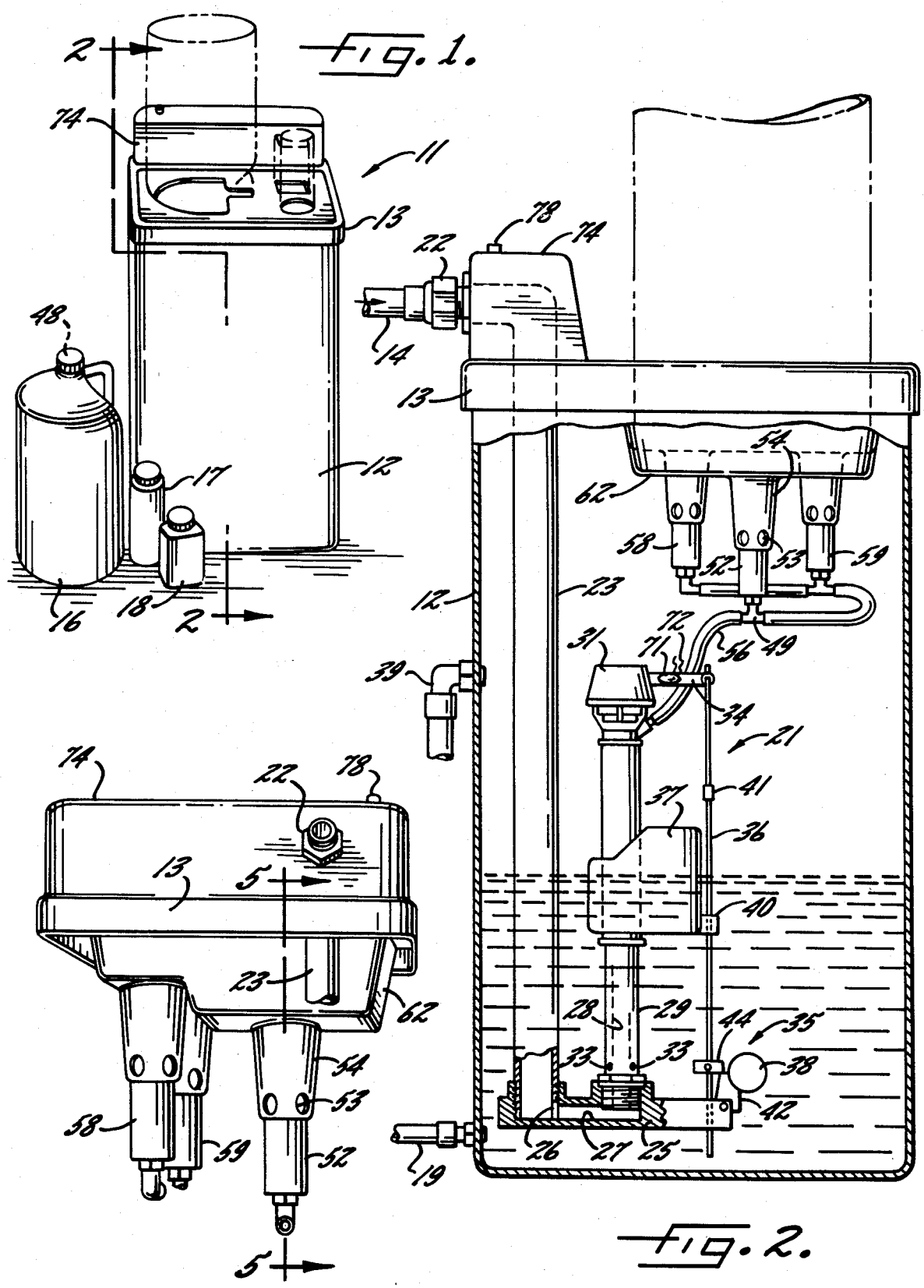

FLUID MIXER ARRANGEMENT

This application is a continuation of application Ser. No. 363,209 filed Mar. 29, 1982, now abandoned; which is a continuation of application Ser. No. 154,373 filed May 20, 1980, now abandoned.

DESCRIPTION OF THE INVENTION

This invention is in the field of fluid mixing arrangements and is more particularly concerned with such arrangements for preparing developer and fixer fluid mixtures for film development such as for X-ray film.

In order to have chemical mixtures available on a demand bases, either large quantities of each mixture must be maintained or supplies of the various components of the mixture must be maintained and periodically mixed together. Often a great advantage in minimizing storage space may be obtained where a needed mixture requires the combination of one or more concentrates with water. An accompanying drawback to not storing the already-mixed solution is that the current supply of the mixture must be monitored and the mixture periodically replenished.

One particular application for demand usage of chemical mixtures is the on-site development of film, particularly X-ray film. Such development processes require the use of both a developer mixture and a fixer mixture. A tank of each of these solutions is typically maintained for the X-ray film developing process, and as each tank's mixture level reaches a selected minimum, the various component liquid concentrates are poured into the tank and sufficient water added to replenish the mixture supply.

In order to avoid the individual handling of various containers of the component liquids, a mixer arrangement has been described which utilizes sized containers appropriate for a particular size of mixing tank, each container having the correct amount of concentrate for one tankful of mixed solution. The bottles of concentrate are shaped to fit into corresponding shaped openings above either a fixer or a developer tank, and are inserted into the openings when a low level alarm is sounded, indicating that the mixed solution supply is at a low level. The bottles include puncturable caps and are inserted into the openings in an inverted fashion onto piercing knives which cut open the caps allowing the concentrates to flow into the tank. At the same time, the user manually turns on a water supply to fill the tank to the desired level, producing a new tankful of fixer or developer solution.

The above described mixer arrangement eliminates the handling of larger sizes of containers of the individual component chemicals but does require that the loading of bottles and application of water be performed upon demand so that the mixture level and component proportions are maintained in each tank. In order to automate the arrangement using size coded concentrate bottles and piercing knives, another system has been described in which the bottles are preloaded while the mixtures in the tanks are not in need of replenishing. Subsequently the seals of the bottles are punctured by piercing knives activated by water pressure from a conventional water source. In this semiautomated arrangement, an electrical system is provided wherein, if the mixture level is low and concentrate bottles are loaded, a solenoid-controlled water valve opens to admit water from the pressurized water source, activating the piercing knives and also adding water to the tank. The electrical circuitry includes a switch which is closed if filled bottles are loaded onto the top of the tank, and a fluid level switch actuated by a float arrangement in the tank which follows the level of the tank mixture.

In this second described prior system, after the tank is filled with the fluid mixture, the solenoid controlled valve turns off the water supply. After the water supply is turned off, and before the mixture level reaches its lowermost point, the empty concentrate bottles are replaced with new, filled bottles for a subsequent mixing operation. While this second-described system eliminates the need to immediately load concentrate bottles upon indication of a low mixture level, there is the added complication and expense of an electrical circuit to operate the solenoid controlled water valve. The power requirements are such that either a relatively large battery or, more likely, a connection to an ac power line is required.

It is consequently an object of the present invention to provide a mixer arrangement having the advantage of preloading bottles containing component fluids without the necessity of costly, complex control circuitry.

Other objects and advantages of the invention will become apparent upon reading the following detailed description and upon reference to the drawings, in which:

FIG. 1 is a perspective view of a developer tank mixer arrangement according to the present invention;

FIG. 2 is a partial sectional view of the tank arrangement of FIG. 1 along the line 2—2 and in the direction of the arrows;

FIG. 3 is an enlarged rear view of the lid for the tank and the housing for the piercing knives and actuating cylinders;

Figure 4:
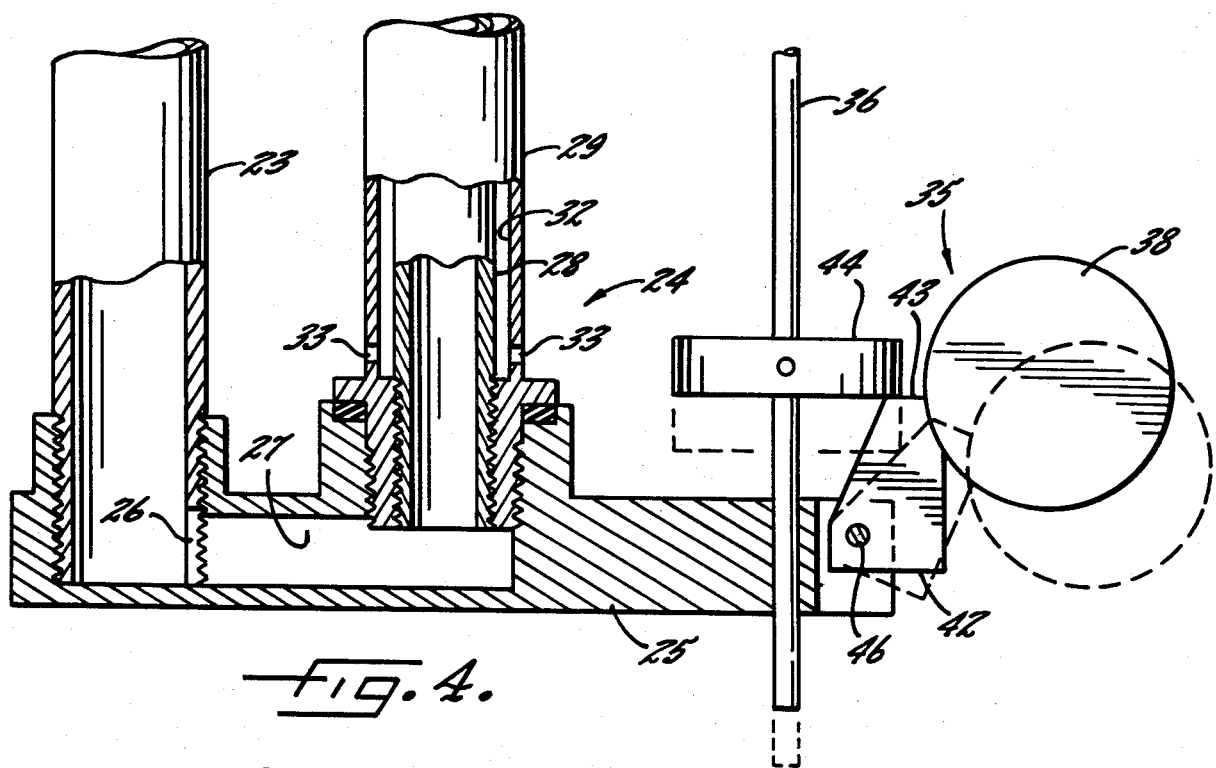
FIG. 4 is an enlarged sectional view of the base portion of the valve assembly for the tank.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

The present invention will be described as embodied in a chemical mixer for providing a developer mixture for the development of photographs or X-ray film. The developer mixer arrangement 11 includes a tank 12 and a top cover 13. Water from a conventional water source is coupled through an inlet conduit 14 into the interior of the tank 12 where it is mixed with concentrated developer chemicals from containers 16, 17, and 18 to form the developer mixture. The developer mixture is drawn on a demand basis from the tank 12 through an outlet tube 19.

Briefly, after an alarm is sounded indicating that the mixer arrangement 11 is being replenished, and after the maximum fluid level has been reached in the tank 12, the empty bottles 16, 17 and 18 of just-used concentrate are removed from the top of the mixer and replaced with full bottles. When the developer fluid in the tank 12 subsequently reaches a minimum level, a hydraulic valve in the water line is opened allowing water to enter the tank 12. The incoming water, from a standard pressurized water source, is supplied at a reduced pressure to three cylinders, the pistons of which include piercing knives which are driven through foil caps on the full, loaded inverted bottles 16, 17 and 18, allowing the fluids in the bottles to pour into the tank as it fills with water from the water source.

In accordance with the invention, in order to couple water from a water source to the inside of the tank 12 and to drive the piston knives into the caps of the bottles, a ball cock valve assembly indicated generally as 21 is responsive to the fluid level in the tank 12. Water from a pressurized water source is coupled through an external pipe or tube 14, a fitting 22, and a pipe 23 to the base of the ball cock assembly 21. The ball cock assembly base portion 24 includes a base member 25 which threadedly receives the lower end of the pipe 23. Water is coupled through an opening 26 in the bottom of the pipe 23, through a passage 27 in the base to the inside of a ball cock inlet tube 28 which is telescoped by an outlet tube 29. The water flows upwardly through the inside of the interior tube 28 to a ball cock valve 31 at the top of the inlet and outlet tubes. The ball cock valve 31 at the top of the pair of tubes 28, 29 controls the flow of water from the interior of the inlet tube 28 to a space 32 between the tubes 28 and 29.

When the valve 31 is open, water flows through the valve, through the space 32, and into the tank 12 through openings 33 near the base of the tube 29. The openings 33 are of a reduced diameter to restrict water flow from the space 32 into the tank. The openings 33 are typically selected to reduce the water pressure in the space 32 from that of the incoming water line to between 50% and 80% of that original amount.

The ball cock valve 31 is operated by a lever 34 which is attached to a connecting link 36, the position of which is controlled by a ball cock float 37 and a secondary float 38. When the fluid mixture in the tank 12 is at its "full" level, which is slightly below the opening from the tank for an overflow tube 39, the ball cock float 37 lifts the connecting link 36 and the lever 34 to the raised position shown in FIG. 2. To accomplish this a boss 40 on the float 37 engages a clip 41 attached to the connecting link 36.

Therefore, when the tank is "full" the ball cock valve 31 closes and further water flow into the tank ceases. In the normal operation of a ball cock arrangement 21, as the fluid level in a tank lowers, further water is added to restore the fluid level to its original condition. In other words, if the float boss 40 is not supporting the clip 41 attached to the connecting link 36, the lever 34 drops, opening the ball cock valve 31 to allow sufficient water into the tank to replace fluid which is used. Such operation is inappropriate for chemical mixers such as the developer 11, since continual addition of water would gradually dilute the mixture.

In order to prevent this dilution of the chemical mix, a secondary float assembly 35 including the secondary float 38 supports the connecting link 36 to maintain the lever 34 in its raised position until the fluid level in the tank 12 has diminished to the level of the secondary float. The float assembly 35 includes the float 38 and a support member which is attached thereto. The support member 42 includes a relatively flat upper surface 43 which receives and bears against the underside of a secondary float support clip 44. When the primary float lifts the connecting link 36 to its fully raised position, the underside of the clip 44, which is attached to the link 36, is slightly above the upper surface 43 of the support member 42. The float assembly 35 is in its raised condition, as shown in FIG. 2 and in solid lines in FIG. 4, due to the buoyancy of the float 38 in the fluid. As the first fluid mix is withdrawn for use through the tube 19, the link 36 drops slightly, but not enough to open the ball cock valve 31, so that the underside of the clip 44 rests upon the surface 43.

This support for the secondary clip 44 maintains the lever arm 34 substantially horizontal, and maintains the ball cock valve 31 closed as fluid is withdrawn from the tank 12. For example, at the fluid level illustrated in FIG. 2, while the primary float 37 and the boss 40 have settled below the clip 41, the lever arm 34 is still supported by the support member 42 bearing against the underside of the clip 44. When the fluid level in the tank 12 falls below the float 38, the float swings downwardly about the pin 46 which pivotally attaches the member 42 to the base 25, releasing the clip 44 so that the lever 34 and the connecting link 36 drop.

Figure 5:
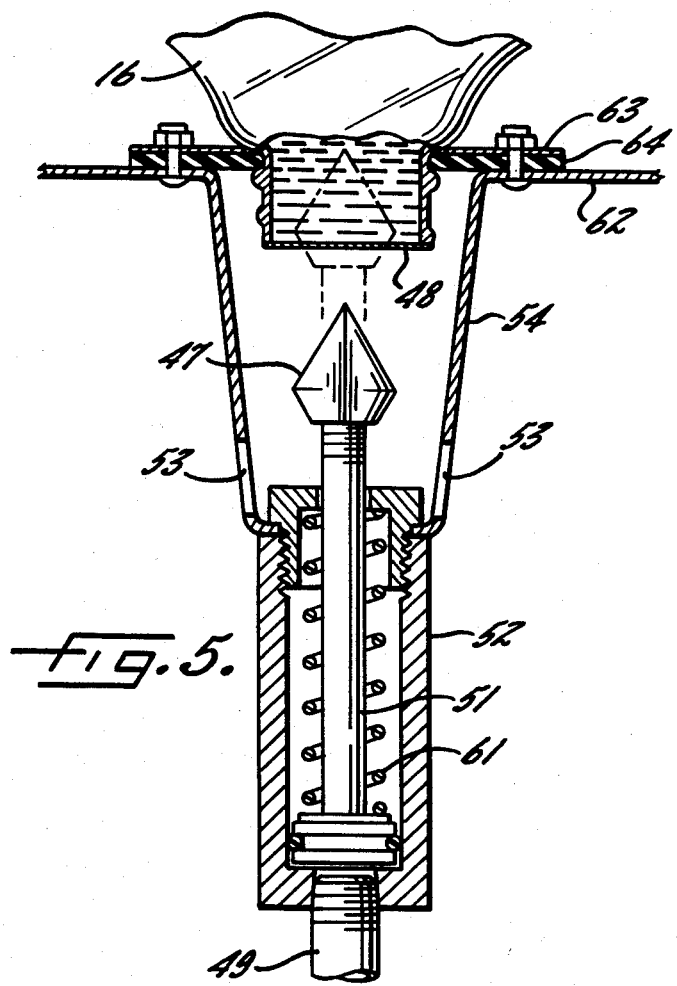
FIG. 5 is an enlarged sectional view of a housing and cylinder for one of the piercing knives along the line 5—5 of FIG. 3 and in the direction of the arrows.

When the ball cock valve 31 opens to allow water to flow into the tank 12, in order to add the other components of the developer mixture from the bottles 16, 17 and 18, the reduced water pressure of the opening 32 between the tubes 28 and 29 is used to activate piercing knives 47 (FIG. 5) which puncture the foil caps 48 of the bottles 16, 17, and 18. As best shown in FIG. 5, with regard to the knife apparatus for the bottle 16, the water from the space 32 is conveyed through a tee fitting 49 to a piston 51 in a cylinder 52, driving the piston 51 upwardly so that the knife blade 47 on the head of the piston punctures the foil cap 48, releasing the fluid from the bottle 16. The fluid in the bottle 16 is free to flow under the influence of gravity into the tank through openings 53 in a housing 54.

The tee fitting 49 is coupled through tubing 56 to a fitting 57 on the ball cock valve 31 which communicates with the opening 32 between the tubes 28, 29. After the valve 31 opens, permitting water to flow into the space 32 and the tube 56, the tube 56 and the other tubes leading to the cylinders such as 52 fill with water and reach a pressure equal to the pressure in the space 32. This pressure, which is reduced from the water source pressure by the openings 33 in the tube 29, is sufficient to drive the pistons upwardly to puncture the bottle caps. The water pressure is communicated to the other two cylinders 58 and 59 through appropriate tubing and fittings. The piercing knife piston and cylinder assemblies for each of the other bottles is substantially identical to the assembly 50 shown in FIG. 5 for the bottle 16, and therefore shall not be described in detail. There is no water flow from the fitting 57 through the tubing 56 other than sufficient water to activate the pistons in the cylinders 52, 58, and 59. The only water flow into the tank is through the above-described openings 33 in the base of the pipe 29.

When the ball cock 31 opens and the pressure appears through the tee fitting 49, the pressure drives the piston 51 upwardly against the force of a spring 61 surrounding the piston 51 in the cylinder 52. The cylinder 52 is comprised of two portions which are threaded together to grip the bottom of the housing 54 therebetween. The housing 54 is conveniently a downwardly extending portion of a general bottle-receiving section 62 commonly formed with the lid 13. Associated with each bottle receiving area, a retaining ring 63 and a bottle gripping ring 64 each having an appropriately sized aperture for the particular bottle, is bolted to the housing 62.

After the tank 12 has reached its "filled" condition, the primary float 37 raises the link 36 and the lever arm 34, closing the valve 31. The pressure in the space 32 and the cylinder 52 dissipates as water flows therefrom through the opening 33 in the bottom of the tube 29. With the removal of pressure from the cylinders 52, the knife-bearing pistons 51 are returned by the springs 61 to their retracted positions inside the cylinders. Therefore, subsequently reloaded bottles are not punctured by the knives.

Figure 6:
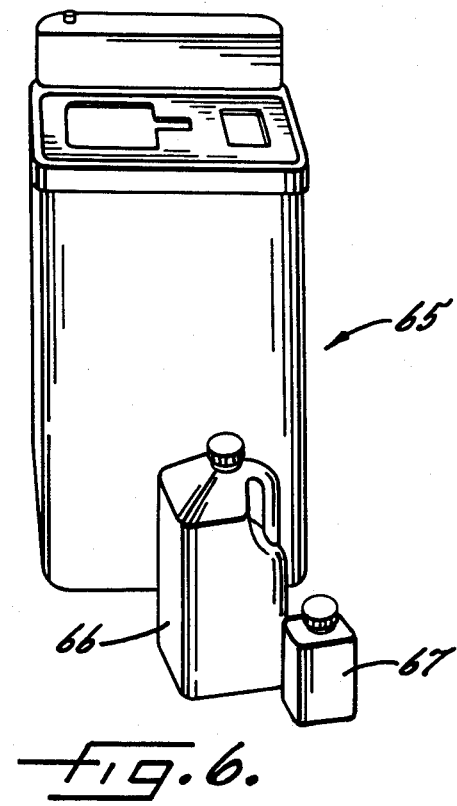
FIG. 6 is a perspective view of a fixer tank mixer arrangement according to the present invention.

For photographic film development applications, a fixer chemical mixture is also needed in addition to the developer mixture. As shown in FIG. 6, a typical fixer chemical mixer 65 is substantially similar to the mixing arrangement for the developer fluid 11, commonly utilizing two bottles of concentrate 66 and 67. Preferably the bottle shapes of the bottles 66 and 67 differ from those of the bottles 16, 17, and 18 so that the bottle openings will accept only the proper bottles to prevent improper fixer and developer mixtures from being prepared. The mixing arrangement 65 for the fixer fluid is substantially the same as the developer arrangement, except for the use of two puncturing knife piston assemblies such as 50 rather than three, and therefore shall not be described in detail.

As is apparent from the earlier description of the sequence of operation of the mixer 11, and from the description of the component parts thereof, it is essential that fresh bottles of concentrate 16, 17 and 18 be loaded in the mixer when the developer fluid level has lowered to the point that the ball cock valve 31 opens permitting water flow into the tank and activation of the knives 47. In order to remind the user of the mixer 11 to reload bottles, a simple battery operated alarm circuit is provided, utilizing a mercury switch 71 mounted on the lever arm 34 of the ball cock. A connection is provided from the mercury switch leads 72 to the alarm circuit, shown generally as 73 in FIG. 7. The alarm circuit 73 is conveniently located on a circuit board mounted beneath a cover 74 on the back of the lid 13 of the mixer 11.

Figure 7:
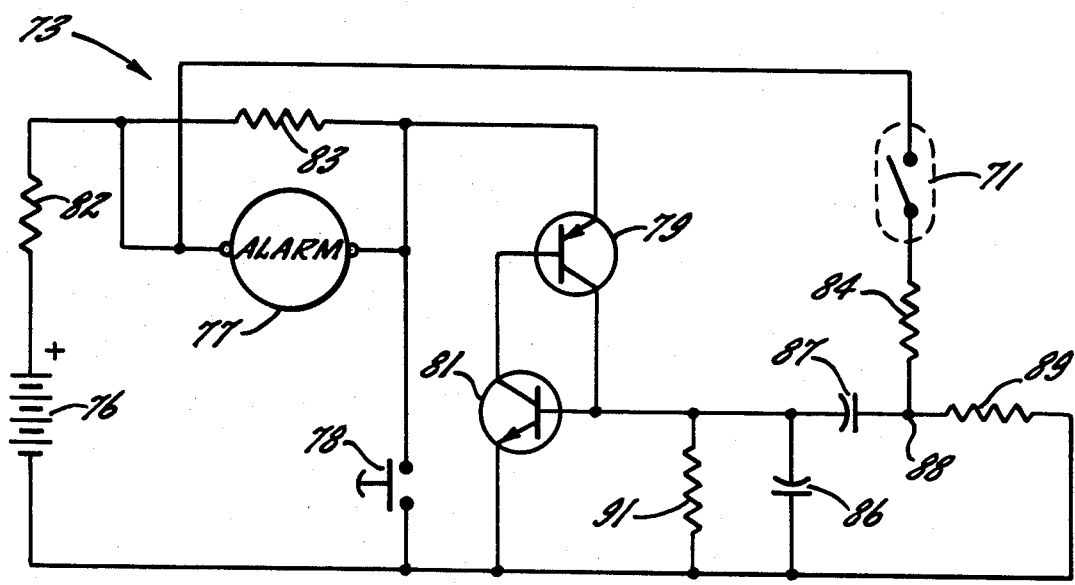
FIG. 7 is an electrical schematic diagram of an alarm for low level detection and indication for the arrangement of FIG. 1.

In the alarm circuit of FIG. 7 a battery 76 is connected in series with an audible alarm 77 through two alternate paths. The first path is through a pushbutton switch 78, which is conveniently physically located on the top of the cover 74 on the mixer 11, and the other path is through a pair of transistors 79, 81. When the pushbutton switch 78 is depressed, completing the circuit, the alarm sounds. When the transistors 79, 81 are activated by the mercury switch 71, which operation is to be described in more detail hereinafter, the alarm 77 also sounds. A current limiting resistor 82 is connected in series with the battery 76, and a resistor 83 is connected in parallel with the alarm 77.

In order to activate the alarm 77 when the fluid level in the tank 12 has fallen such that the lever arm 34 drops, the mercury switch 71 closes when the lever arm falls. Closing the switch 71 couples a pulse through a resistor 84, to capacitor 86, having a parallel resistor 91, through a voltage divider arrangement including the capacitor 86 and a series capacitor 87. The voltage on the capacitor 86 turns on the transistor 81 which in turn turns on the transistor 79 completing a circuit path for the battery and the alarm, sounding the alarm. The voltage at the point 88 between the resistor 84 and a series resistor 89 reaches a dc. value dependent primarily upon the values of the resistors 82, 84 and 89. This dc. voltage is blocked by the capacitor 87 from the base of the transistor 81.

After the mercury switch 71 has closed, and the transistors 81 and 79 are turned on, no further voltage is coupled to the base of the transistor 81. The less than one volt junction drop voltage is then present between the base and emitter of the transistor 81. Therefore, once the alarm is actuated by the closing of the mercury switch 71, the alarm may be deactivated by depressing the pushbutton switch 78, which momentarily takes away the voltage from the emitter of the transistor 79, turning off the transistors. Conveniently, during times when the transistors are turned off, depressing the switch 78 actuates the alarm 77 for as long as the pushbutton switch is depressed, so that the battery 76 can be tested whenever desired.

To summarize the operation of the mixer 11, as an initially "full" tank 12 of fluid is used, the fluid level decreases eventually to a point where the secondary float 38 releases the connecting link 36, dropping the lever 34. The ball cock valve 31 opens, and water flows into the tank through the openings 33. At the same time there develops in the space 32 and tubing 56 a reduced pressure head to drive the knife blades 47 through the foil caps of the chemical concentrate containers. Simultaneously, the mercury switch 71 actuates the alarm 77 to indicate to an attendant or user of the mixture that the fluid in the loaded bottles is being used. The concentrate in the bottles pours into the tank and is mixed with the incoming water from the water line. Meanwhile, the user of the mixer 11 pushes the pushbutton 78 to deactivate the alarm 77 and obtains the necessary bottles of concentrate to reload the mixer. After the punctured bottles have emptied and the tank 12 is again "full", with the knives 47 returning to their lowered position, the used bottles are discarded and replaced by full bottles of concentrate.

The user of the mixer therefore does not need to be concerned with the lowering of the level of fluid in the tank in order to add concentrate or load bottles on demand, but is able to preload the mixer for the next sequence of mixing operations.

It can be seen therefore that a mixer arrangement has been described which has the advantages of preloading of bottles of concentrate without the necessity of a complex electronic control system. The use of a low power consumption audible alarm and a long life battery assures a long life for the alarm circuit. Due to the all-hydraulic valve operation of the water control no power-consuming electronic valving apparatus is required.

What is claimed is:
1. A fluid mixing arrangement comprising:
 (a) a tank;
 (b) a bottle containing a first fluid;
 (c) hydraulically activated means for piercing the bottle allowing the first fluid to flow from the bottle and into the tank;
 (d) a ball cock valve in the tank having: an inlet coupled to a source of pressurized second fluid; and, an outlet coupled to the interior of the tank and to the bottle piercing means, said ball cock valve, when open, coupling the second fluid to activate the bottle piercing means and to feed the second fluid into the tank;

(e) means for opening and closing said ball cock valve, said opening and closing means comprising:
    a lever having a first end connected to the ball cock valve; and
    a rod pivotally connected to a second end of the lever, said rod including an upper boss and a lower boss, the upper and lower bosses being fixed relative to the rod;

(f) a primary float in the tank slideably mounted on the rod between the upper boss and the lower boss for rising and falling along the rod as the level of fluid in the tank rises and falls, said primary float engaging the upper boss when the fluid level in the tank rises to a selected highest level to raise the rod to an upper position and close the valve; and (g) secondary float means comprising a support member, pivotally movable with respect to the tank, for engaging portions of the lower boss fixed relative to the rod when the fluid level in the tank rises to the selected highest level to fix the rod in the upper position and latch the valve closed, and for maintaining the rod in the fixed upper position and preventing the opening of the valve as the fluid level falls until a selected minimum level is reached, and wherein the support member pivots away from the portions of the lower boss fixed relative to the rod when the selected minimum level is reached to allow the rod to fall from the upper position to a lower position and open the valve, said support member engaging portions of the lower boss fixed relative to the rod when said rod falls from the upper position to the lower position.

2. The arrangement of claim 1 which further comprises a second bottle of fluid which is positioned adjacent the tank, the bottle piercing means including means for piercing the second bottle.

3. The arrangement of claim 1 in which the bottle piercing means comprises a hydraulic cylinder, the piston of which carries a piercing knife for piercing the bottle.

4. The arrangement of claim 1 wherein said lever is positioned substantially horizontally when said ball cock valve is closed and pivots to an inclined position when said valve opens, and wherein said arrangement further comprises an alarm circuit comprising a gravity activated switch having either an open condition or a closed condition, said switch being disposed on said lever and wherein the condition of the switch changes when the position of the lever changes between the horizontal position and the inclined position.

* * * * *

UNITED STATES PATENT OFFICE
CERTIFICATE OF CORRECTION

Patent No. 4,488,582            Dated December 18, 1984

Inventor(s) William F. Schilling

It is certified that error appears in the above-identified patent and that said Letters Patent are hereby corrected as shown below:

Column 1, Line 7: Change "20" to --29--.

Column 1, Line 15: Change "bases" to --basis--.

Signed and Sealed this

Third Day of December 1985

[SEAL]

Attest:

DONALD J. QUIGG

Attesting Officer      Commissioner of Patents and Trademarks